United States Patent [19]
Shimozono

[11] Patent Number: 6,097,691
[45] Date of Patent: Aug. 1, 2000

[54] OPTICAL DEVICE FOR RECORDING OR READING DATA TO AN OPTICAL DISK

[75] Inventor: Hiroaki Shimozono, Yokohama, Japan

[73] Assignee: Asahi Glass Company Ltd., Tokyo, Japan

[21] Appl. No.: 09/148,505

[22] Filed: Sep. 4, 1998

[30] Foreign Application Priority Data

Sep. 5, 1997 [JP] Japan ................................. 9-241433

[51] Int. Cl.[7] .............................. G02B 13/00; G11B 7/00
[52] U.S. Cl. .................. 369/112; 369/44.23; 369/44.37; 369/94
[58] Field of Search ........................ 369/112, 94, 44.23, 369/44.37, 117, 118, 44.24, 44.14, 121, 110, 124, 116

[56] References Cited

U.S. PATENT DOCUMENTS

| | | | |
|---|---|---|---|
| 5,724,335 | 3/1998 | Kobayashi | 369/112 |
| 5,835,473 | 11/1998 | Shimozono et al. | 369/112 |
| 5,870,371 | 2/1999 | Tsuchiya et al. | 369/112 |
| 5,872,761 | 1/1999 | Sugi et al. | 369/112 |
| 5,892,749 | 4/1999 | Yamanaka | 369/112 |
| 5,901,132 | 5/1999 | Choi | 369/124 |
| 5,933,401 | 8/1999 | Lee et al. | 369/112 |
| 5,956,312 | 9/1999 | Ishihara | 369/112 |

FOREIGN PATENT DOCUMENTS

| | | |
|---|---|---|
| 64-25113 | 1/1989 | Japan . |
| 4-28282 | 5/1992 | Japan . |
| 7-72386 | 3/1995 | Japan . |
| 8-179195 | 7/1996 | Japan . |
| 9-43510 | 2/1997 | Japan . |
| 9-81953 | 3/1997 | Japan . |

*Primary Examiner*—Do Hyun Yoo
*Assistant Examiner*—Kim-Kwok Chu
*Attorney, Agent, or Firm*—Oblon, Spivak, McClelland, Maier & Neustadt, P.C.

[57] ABSTRACT

An optical device wherein when reading of CD is conducted, light from a first optical light source 1 is passed through a first auxiliary lens 2, an optical material 3 and an objective lens 4 to be converged onto a data recording surface 5a of CD and when reading of DVD is conducted, light from a second light source 6 is passed through a second auxiliary lens 7, the optical material 3 and the objective lens 4 to be converged onto a data recording surface 8a of DVD.

11 Claims, 6 Drawing Sheets

OPTICAL DEVICE FOR RECORDING OR READING DATA TO AN OPTICAL DISK

BACKGROUND OF THE INVENTION

1. Field of the Invention

The present invention relates to an optical device for recording or reading optical data by irradiating light such as a laser light to an optical disk. In particular, the present invention relates to an optical device suitable for recording or reading CD (a compact disk) and DVD (a digital video disk).

2. Discussion of Background

There have been proposed optical devices for recording or reading DVD having a transparent substrate of 0.6 mm thick and CD having a transparent substrate of 1.2 mm thick by means of a single objective lens (JP-A-9-43510, JP-A-9-81953).

In a device disclosed in JP-A-9-43510, a divergence angle changing lens for changing a divergence angle of light from a laser light source is provided between the laser light source and an objective lens, and when DVD or CD is recorded or read, the divergence angle changing lens is moved along the optical axis depending on a thickness of a transparent substrate of DVD or CD whereby aberration is corrected.

In a device disclosed in JP-A-9-81953, a finite type objective lens is commonly used for DVD and CD, and when recording or reading is effected for DVD or CD, a laser light source is moved along the optical axis in response to a thickness of a transparent substrate of DVD or CD whereby aberration is corrected.

In the former device, when switching of mode is conducted from the recording or reading of DVD to the recording or reading of CD, aberration characteristics of the lens concerning light passing on the optical axis, in particular, a spherical aberration can be made substantially zero by moving the divergence angle changing lens along the optical axis. However, it required a mechanism to move the divergence angle changing lens. Further, aberration characteristics on light passing out of the optical axis, in particular, an off-axial coma aberration could not be satisfied for conducting recording or reading.

In the later device, when switching of mode is conducted from the recording or reading of DVD to the recording or reading of CD, aberration characteristics of light passing on the optical axis, in particular, a spherical aberration can be made substantially zero by moving the light source along the optical axis to thereby change an object-image distance. However, it required a mechanism for changing the object-image distance. Further, aberration characteristics on light passing out of the optical axis, in particular, an off-axial coma aberration could not be satisfied for conducting recording or reading.

Since the above-mentioned conventional devices have a large off-axial coma aberration, the optical performance shows a large reduction when the light source, the objective lens and so on are positioned inclined from the optical axis or shifted from the optical axis. Accordingly, high accuracy was required in positioning the objective lens and other elements in assembling operations of the optical device, and therefore, productivity is decreased. Further, in the conventional device for which high accuracy is required in determination of the position of the objective lens or the other elements, gradual deterioration of the optical performance is caused due to the wearing of a moving mechanism for moving the lens or the light source, the wearing resulting an inclination of the objective lens and other elements from the optical axis or a shift thereof from the optical axis.

Further, since the conventional devices have a large off-axial coma aberration, an allowable range is narrow in determining the position of the objective lens, in particular, a shift from the optical axis in driving the objective lens through an autofocusing mechanism when the optical devices are actually operated. Therefore, the optical performance is reduced. Further, since the conventional optical devices have a moving mechanism, it is difficult to achieve size reduction and weight reduction.

SUMMARY OF THE INVENTION

It is an object of the present invention to provide an optical device which does not require a moving mechanism whereby size reduction and weight reduction can be achieved even in a case of recording or reading optical disks each having a transparent substrate of different thickness and which provides excellent productivity and aberration characteristics while a gradual change of an inclination of the light source, the lens and so on or a gradual change of a shift of these elements from the optical axis are minimized.

In accordance with the present invention, there is provided an optical device for recording or reading data in a data recording surface of an optical disk by collecting light from a light source on the data recording surface through an objective lens, reflection light from the data recording surface being received by a light receiving element through the objective lens, the optical device being characterized in that a first light source and a second light source are provided as the light source; a first auxiliary lens and a second auxiliary lens are provided in addition to the objective lens; a first optical disk and a second optical disk are provided as the optical disk and at least one of the first and second optical disks are adapted to be inserted to record or read the data in the data recording surface wherein the thickness of a transparent substrate of the first optical disk is different from the thickness of a transparent substrate of the second optical disk;

wherein the recording or reading of the data in the data recording surface of the first optical disk is effected by collecting, on the data recording surface of the first optical disk, the light from the first light source through the first auxiliary lens and the objective lens in this order; and the recording or reading of the data in the data recording surface of the second optical disk is effected by collecting, on the data recording surface of the second optical disk, the light from the second light source through the second auxiliary lens and the objective lens in this order.

Further, in accordance with the present invention, there is provided an optical device for recording or reading data in a data recording surface of an optical disk by collecting light from a light source on the data recording surface through an objective lens, reflection light from the data recording surface being received by a light receiving element through the objective lens, the optical device being characterized in that a first light source and a second light source are provided as the light source; a first auxiliary lens, a second auxiliary lens and an optical material are provided in addition to the objective lens; a first optical disk and a second optical disk are provided as the optical disk and at least one of the first and second optical disks are adapted to be inserted to record or read the data in the data recording surface wherein the thickness of a transparent substrate of the first optical disk is different from the thickness of a transparent substrate of the second optical disk; wherein the recording or reading of the data in the data recording surface of the first optical disk is effected by collecting, on the data recording surface of the first optical disk, the light from the first light source by means of the first auxiliary lens, the optical material and the objective lens in this order; and the recording or reading of the data in the data recording surface of the second optical disk is effected by collecting, on the data recording surface of the second optical disk, the light from the second light source by means of the second auxiliary lens, the optical material and the objective lens in this order.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
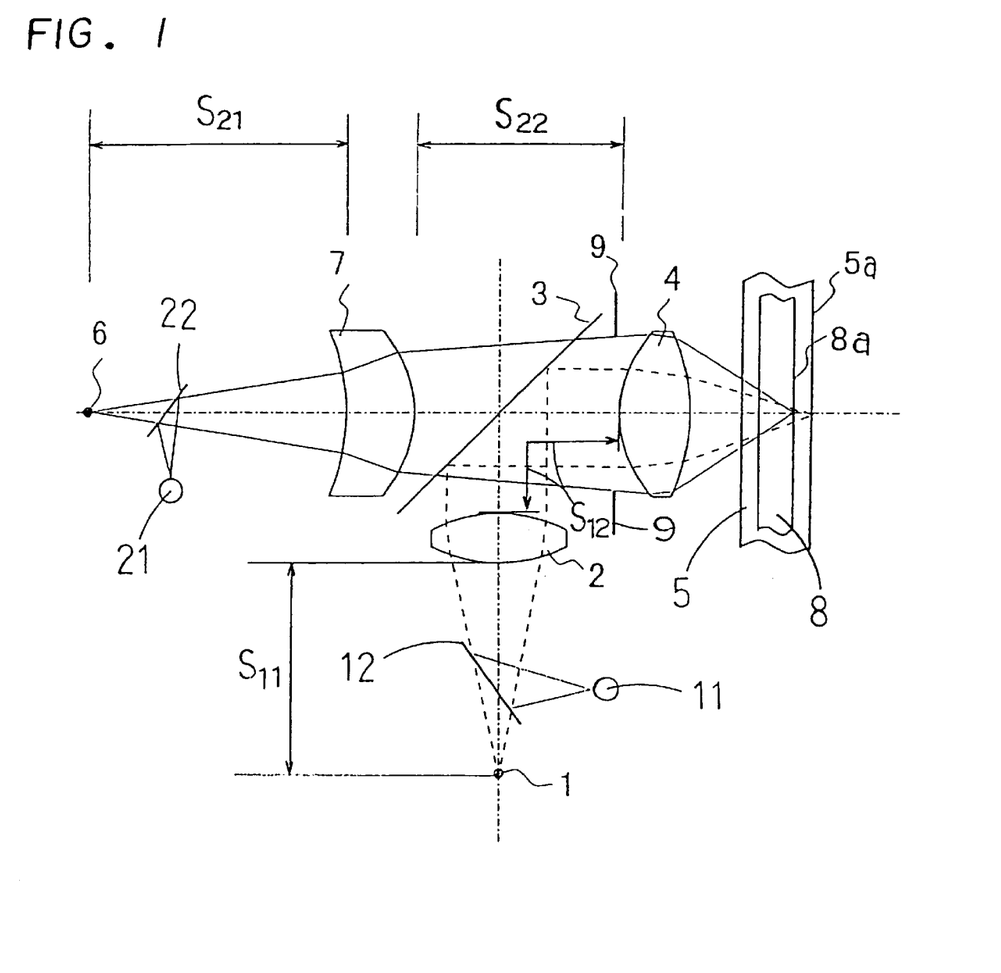
FIG. 1 is a basic diagram showing an optical device according to the present invention.

FIG. 1 shows an example of the optical device of the present invention and passages of light formed in the optical device. In FIG. 1, reference numeral 1 designates a first light source, numeral 2 a first auxiliary lens, numeral 3 an optical material, numeral 4 an objective lens, numeral 5 a first optical disk, numeral 5a a data recording surface of the first optical disk 5, numeral 6 a second light source, numeral 7 a second auxiliary lens, numeral 8 a second optical disk, numeral 8a a data recording surface of the second optical disk 8, numeral 9 an aperture, numeral 11 a first light receiving element, numeral 12 an optical material for the first light receiving element, numeral 21 a second light receiving element, numeral 22 an optical material for the second light receiving element 21, symbol $S_{11}$ represents a distance on the optical axis from the first light source 1 to a first surface of the first auxiliary lens 2 (facing a light source side), symbol $S_{12}$ a distance on the optical axis from a second surface of the first auxiliary lens 2 to a first surface of the objective lens 4, symbol $S_{21}$ a distance on the optical axis from the second light source 6 to a first surface of the second auxiliary lens 7 (facing a light source side), and symbol $S_{22}$ a distance on the optical axis from a second surface of the second auxiliary lens 7 to a first surface of the objective lens 4. In the following description and Tables, units for dimensions such as distance, interval, length, thickness and so on indicate mm.

Light from the first light source 1 is successively passed through the optical material 12 for the first light receiving element 11, the first auxiliary lens 2, the optical material 3 and the objective lens 4 to be introduced into and converged on the data recording surface 5a of the first optical disk 5. Light from the second light source 6 is successively passed through the optical material 22 for the second light receiving element 21, the second auxiliary lens 7, the optical material 3 and the objective lens 4 to be introduced into and converged on the data recording surface 8a of the second optical disk 8. Namely, the optical system in the optical device of the present invention constitutes in its entirety a finite type optical system.

Marks representing digital signals are recorded in the data recording surface 5a of the first optical disk 5 and the data recording surface 8a of the second optical disk 8. When the dimension of 1 bit for each mark is several $\mu$m or less, the optical system of the optical device of the present invention should have a diffraction-limited performance in order to obtain precise recording or reading.

The first light source 1 and the second light source 6 may be laser light sources, for instance. A laser light source for emitting beams having a wavelength of 780 nm may be used for CD and a laser light source for emitting beams having a wavelength of 650 nm may be used for DVD. Further, the wavelength of the laser light from the first light source 1 may be the same as the wavelength for the second light source 6.

For the first auxiliary lens 2 and the second auxiliary lens 7, collimator lenses may be used, and for the optical material 3, a half mirror may be used, for example.

In the present invention, a combination of the first auxiliary lens 2 and the objective lens 4 is optimized with respect to the thickness of the transparent substrate of the first optical disk 5 so that light from the first light source 1 is well converged on the data recording surface 5a of the first optical disk 5.

Further, a combination of the second auxiliary lens 7 and the objective lens 4 is optimized with respect to the thickness of the transparent substrate of the second optical disk 8 so that light from the second light source 6 is well converged on the data recording surface 8a of the second optical disk 8.

In other words, the optical device of the present invention is so constituted that the aberration characteristics to light from the first light source 1 are optimized, either in off-axial or on-axial, by the combination of the auxiliary lens 2 and the objective lens 4 with respect to the thickness of the transparent substrate of the first optical disk 5 and the aberration characteristics to light from the second light source 6 are optimized, either in off-axial or on-axial, by the combination of the second auxiliary lens 7 and the objective lens 4 with respect to the thickness of the transparent substrate of the second optical disk 8, so that there are obtainable preferable recording or reading of the first optical disk 5 and the second optical disk 8 wherein the thickness of the transparent substrate of the first optical disk 5 is different from the thickness of the transparent substrate of the second optical disk 8. The above-mentioned aberration characteristics are influenced by not only the thickness of the transparent substrates but also the refractive index of the transparent substrate.

Generally, an optical system in an optical device for an optical disk has an aberration, in particular, a spherical aberration of the third order. With respect to the above-mentioned optimization in the present invention, when data in the data recording surface of an optical disk are to be recorded or read, the absolute value in RMS value of the spherical aberration of the third order should be 0.03 $\lambda$ or less and an off-axial coma aberration in an image height of 0.1 mm should be 0.03 $\lambda$ or less where $\lambda$ represents a wavelength of light from the light source.

When the absolute value in RMS value of the spherical aberration of the third order is 0.03 $\lambda$ or less, accuracy for recording or reading is improved 0.1%-several % or more in comparison with a case of more than 0.03 $\lambda$. A further preferable range of the absolute value in RMS value of the spherical aberration of the third order is 0.01 $\lambda$ or less. In this case, accuracy for recording or reading is improved 0.5%-several % or more in comparison with a case that the absolute value in RMS value of the spherical aberration of the third order is more than 0.03 $\lambda$. Signs of RMS value of the spherical aberration of the third order are so determined as to be positive when the phase of a wavefront in a peripheral portion is ahead the phase of that on the optical axis and negative when the former is lag with respect to the later.

When the off-axial coma aberration in an image height of 0.1 mm is 0.03 $\lambda$ or less, an allowable range of an inclination or a shift of the light source, the auxiliary lens, the objective lens or the optical disk from the optical axis is expanded 0.1%-several % or more in comparison with a case of more than 0.03 $\lambda$. A preferable range of the off-axial coma aberration in an image height of 0.1 mm is 0.01 $\lambda$ or less. In this case, an allowable range is expanded 0.5%-several % or more in comparison with a case of more than 0.03 $\lambda$.

The combination of the first auxiliary lens 2 and the objective lens 4 constitutes a finite type lens, and the combination of and the auxiliary lens 7 and the objective lens 4 also constitutes a finite type lens. Such structure is employed because light from the light source which is located in a finite distance range with respect to the optical disk is converged on the data recording surface of the optical disk.

At least one of the first auxiliary lens 2 and the second auxiliary lens 7 may be a collimator lens. The following various kinds of combination can be considered as to the combination of the first auxiliary lens 2 and the objective lens 4 and the combination of the second auxiliary lens 7 and the objective lens 4.

1) A combination wherein the first auxiliary lens 2 is a collimator lens, the objective lens 4 is an infinite type lens and the second auxiliary lens 7 is a lens other than the collimator lens, 2) A combination wherein the second auxiliary lens 7 is a collimator lens, the objective lens 4 is an infinite type lens and the first auxiliary lens 2 is a lens other than a collimator lens, 3) A combination wherein the first auxiliary lens 2 and the second auxiliary lens 7 are both collimator lenses and the objective lens 4 is an infinite type lens (in this case, the position of the data recording surface 5a of the first optical disk 5 coincides with the position of the data recording surface 8a of the second optical disk 8 on the optical axis), and 4) A combination wherein the first auxiliary lens 2 and the second auxiliary lens 7 are both lenses other than collimator lenses and the first auxiliary lens 2 or the second auxiliary lens 7 and the objective lens 4 constitute a finite type lens Further, it is preferable to satisfy at least one of the following conditions (A) and (B):

$$-0.35 \leq \beta_1 \leq -0.06, \tag{A}$$

and, $$-0.25 \leq \beta_2 \leq -0.07 \tag{B}$$

where $\beta_1$ represents a lateral magnification of the objective lens in correspondence with a combination of the first light source 1 and the transparent substrate of the first optical disk 5 and $\beta_2$ represents a lateral magnification of the objective lens in correspondence with a combination of the second light source 6 and the transparent substrate of the second optical disk 8 provided that $t_1 > t_2$ wherein $t_1$ represents the thickness of the transparent substrate of the first optical disk and $t_2$ represents the thickness of the transparent substrate of the second optical disk.

In the satisfaction of the above-mentioned condition (A), correction of aberration can easily be achieved for the determination of an aspheric surface of the first auxiliary lens 2 by using an aspheric coefficient of a lower order in comparison with a case that the condition (A) is not satisfied. Accordingly, the shape of the first auxiliary lens 2 is not complicated whereby processing to the auxiliary lens 2 is not difficult and productivity can be improved.

In the satisfaction of the above-mentioned condition (B), correction of aberration can easily be achieved for the determination of an aspheric surface of the second auxiliary lens 7 by using an aspheric coefficient of a lower order in comparison with a case that the condition (B) is not satisfied. Accordingly, the shape of the second auxiliary lens 7 is not complicated whereby processing to the auxiliary lens 7 is not difficult and productivity can be improved. It is therefore preferable to satisfy both the above-mentioned conditions (A) and (B).

Further, when $t_1 > t_2$, it is in particular preferable to satisfy the following condition (C) so that correction of aberration can be achieved for the determination of aspheric surfaces for the first auxiliary lens 2 and the second auxiliary lens 7 by using an aspheric coefficient of a lower order.

$$\beta_1 < \beta_2 \tag{C}$$

In the above-mentioned condition (C), a more preferable range falls in a range as described in the following (D):

$$\beta_1 < (\beta_2 - 0.015) \tag{D}$$

With respect to relations to $S_{11}$ and $S_{21}$ provided $t_1 > t_2$, it is desirable that 8 mm $\leq S_{11} \leq$ 14.5 mm, and 8 mm $\leq S_{21} \leq$ 25 mm. When $S_{11} \leq$ 14.5 mm, and $S_{21} \leq$ 25 mm, miniaturization of the optical device can be achieved in comparison with a case that such conditions are not satisfied. Further, correction of aberration is possible when 8 mm$\leq S_{11}$ and 8 mm$\leq S_{21}$.

In FIG. 1, a half mirror is used for the optical material 3. Light from the first light source 1 is passed through the first auxiliary lens 2 and is reflected by the half mirror to be incident into the objective lens 4. Light from the second light source 6 is passed through the second auxiliary lens 7 and the half mirror to be incident into the objective lens 4.

The optical material 3 is provided depending on requirement. In FIG. 1, the first light source 1 and the first auxiliary lens 2 may be arranged at positions where light from the fist light source 1 is passed though the first auxiliary lens 2 to be directly incident into the objective lens 4, without providing the optical material 3. Further, in FIG. 1, the second light source 6 and the second auxiliary lens 7 may be arranged at positions where light from the second light source 6 is passed through the second auxiliary lens 7 to be incident into the objective lens 4, without providing the optical material 3. In a case of using the optical material 3, the optical material 3 is not limited to the half mirror but may be a prism or the like.

The aperture 9 functions to change a numeral aperture. The reason why the aperture 9 is provided is that when a numerical aperture for the first optical disk 5 is different from a numerical aperture for the second optical disk 8 and when recording or reading is to be conducted, the numerical aperture has be adjusted by the aperture 9. When a numerical aperture for the first optical disk 5 is the same as a numerical aperture for the second optical disk 8, the aperture 9 is generally unnecessary.

A mechanical aperture or an optical aperture may be used for the aperture 9. However, the aperture 9 is not in particular limited thereto. As an example of the mechanical aperture, a plurality of plate-like materials each having an opening of a diameter corresponding to a numerical aperture are prepared and a suitable plate-like material is used depending on condition. As an example of the optical aperture, two thin optical films having different wavelength selectivity from each other are formed on a transparent plate-like material wherein the first circle having a diameter corresponding to a first numerical aperture permits a first wavelength to pass through and the second circle having a diameter corresponding to a second numerical aperture permits a second wavelength to pass through, and the first circle and the second circle are arranged to be in a concentric relation.

A finite type or an infinite type is usable for the objective lens 4. When an infinite type is used for the objective lens, the first auxiliary lens 2 or the second auxiliary lens 7 should be a collimator lens. The infinite type objective lens may be a finite type lens which is so designed as to be used for an infinite type. In FIG. 1, the objective lens 4 is constituted by a signal lens. However, the present invention is not limited to use a single lens but the objective lens 4 may be constituted by a plurality of lenses. Further, in the embodiment shown in FIG. 1, half mirrors are used for the optical material 12 for the first light receiving element 11 and the optical material 22 for the second light receiving element 21 wherein reflection light from the half mirrors are introduced into the light receiving elements whereby data in the data recording surfaces of the optical disks are read. However, these optical materials 12, 22 are not limited to half mirrors. Means for reading data in the data recording surfaces of the optical disks by the light receiving elements are not limited to the construction as shown in FIG. 1.

Description has been made as to recording or reading two kinds of optical disk. However, the present invention is not limited thereto and recording or reading can be conducted to three or more optical disks wherein the thickness of these transparent substrate are all different. Further, the optical disks used in the present invention is not limited to DVD or CD but may be another kind of optical disk.

In a case of reading two or more different kinds of optical disk in the present invention, a plurality of light sources may be used wherein wavelengths of light may not be changed for the optical disks, i.e., the same wavelength may be used for the optical disks, or wavelengths of light may be changed for the optical disks. Further, when the wavelength of light from the first light source is represented as $\lambda_1$ and the wavelength of light from the second light source is represented as $\lambda_2$, $\lambda_1 > \lambda_2$ is preferred from the standpoint of correction of aberration provided $t_1 > t_2$.

Generally, synthetic resin is used as materials for the first auxiliary lens 2, the second auxiliary lens 7 and the objective lens 4. However, glass may be used for these lenses. Further, an autofocusing means for the objective lens may be provided depending on requirement.

An example of steps of optical design to realize the optical device of the present invention will be described.

First, a collimator lens is designed by a conventional technique. The collimator lens is used as the first auxiliary lens 2.

Then, the objective lens 4 is designed so that when it is combined with the collimator lens, an on-axial spherical aberration and an off-axial coma aberration can be minimized as possible with respect to the first light source 1 and the thickness of the transparent substrate of the first optical disk 5.

Further, the second auxiliary lens 7 is designed so that when it is combined with the objective lens 4, an on-axial spherical aberration and an off-axial coma aberration can be minimized as possible with respect to the second light source 6 and the thickness of the transparent substrate of the second optical disk 8.

The design of the optical device allows recording or reading of optical disks having transparent substrates of different thickness by changing the light sources under conditions that the spherical aberration and the coma aberration have been well adjusted.

Now, the present invention will be described in detail with reference to examples. However, it should be understood that the present invention is by no means districted by such specific examples.

EXAMPLE

The optical device shown in FIG. 1 was prepared on premise that CD would be used for the first optical disk 5, DVD would be used for the second optical disk 8, and recording and reading of CD and DVD would be conducted.

A light source for emitting light having a wavelength of 780 nm was used for the first light source 1. Light from the first light source 1 was passed through the first auxiliary lens 2; reflected by the half mirror 3, and pass through the objective lens 4 so that the light was collected on the data recording surface of CD.

A laser light source for emitting light having a wavelength of 650 nm was used for the second light source 6. The optical characteristics of the second auxiliary lens 7 were set to constitute a finite type lens in association with the second auxiliary lens 7 and the objective lens 4. Light from the second light source 6 was passed through the second auxiliary lens 7, the half mirror 3 and the objective lens 4 in this order to be collected onto the data recording surface of DVD. Synthetic resin was used as materials for the first auxiliary lens 2, the second auxiliary lens 7 and the objective lens 4. Specifications of lenses as used are shown in Tables described below wherein the unit of wavelength is nm.

In Tables, f indicates a focal distance, d indicates a thickness at the center of each of the lenses and n indicates a refractive index of each of the lenses. Aspheric shapes of the first auxiliary lens 2, the second auxiliary lens 7 and the objective lens 4 are expressed by formula 1 wherein each coefficient is shown in Table 1. "E-1" represents $10^{-1}$ and "E-2" represents $10^{-2}$.

$$Z_j = (1/r_j)h^2/[1+\{1-(1+k_j)(1/r_j)^2h^2\}^{0.5}] + \Sigma a_{i,j}h^i \quad \text{Formula 1}$$

where i is 2, 4, 6, 8 or 10; j is 1 or 2; h is a height from the optical axis; $z_j$ is a distance from a surface in contact with the apex of a j th aspheric surface (j=1 or 2) to a point having a height h on the aspheric surface; and $r_j$, $k_j$ and $a_{i,j}$ are respectively coefficients of the j th surface.

Example 1

A collimator lens was used for the first auxiliary lens 2 so that light from the first light source 1 becomes parallel after having been passed through the first auxiliary lens 2. Table 1 shows specifications of the first auxiliary lens 2; Table 2 shows specifications of the objective lens 4; Table 3 shows specifications of the second auxiliary lens 7, Table 4 shows specifications of the optical disks.

Figure 2:
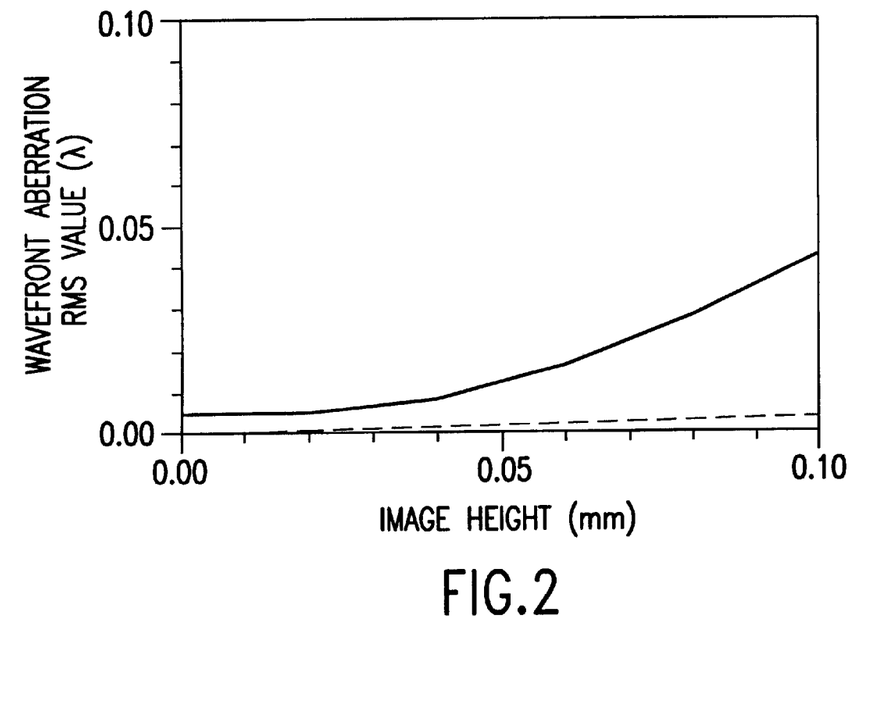
FIG. 2 is a characteristic diagram showing an off-axial wavefront aberration of an optical system for recording or reading CD according to a first embodiment of the present invention.
Figure 3:
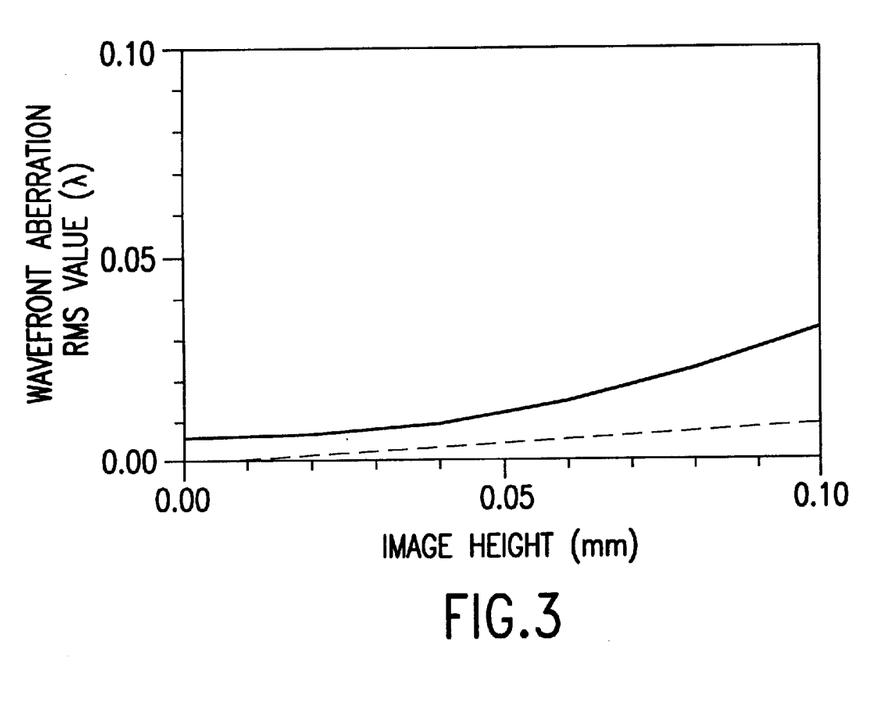
FIG. 3 is a characteristic diagram showing an off-axial wavefront aberration of an optical system for recording or reading DVD according to the first embodiment.

FIG. 2 shows an off-axial wavefront aberration characteristic, obtained by calculation, of a combination of the first auxiliary lens 2 and the objective lens 4 (an optical system for recording or reading CD). In FIG. 2, a solid line shows a wavefront aberration including all kinds of aberration (which is applicable also to Figures described below). A broken line shows a wavefront aberration for only a coma aberration component among wavefront aberrations including all kinds of aberration (which is also applicable to Figures described below). FIG. 3 shows an off-axial wavefront aberration characteristic, obtained by calculation, of a combination of the second auxiliary lens 7 and the objective lens 4 (an optical system for recording or reading DVD).

Example 2

Figure 4:
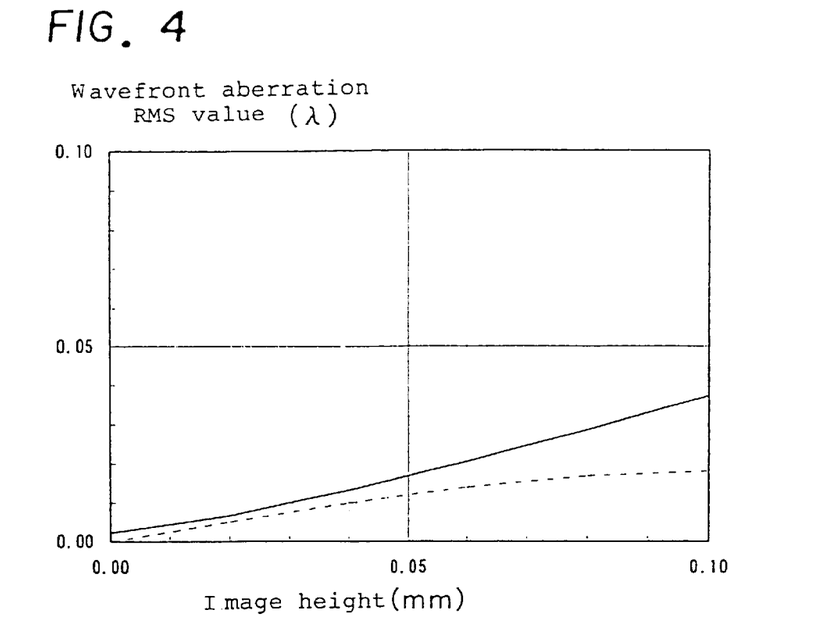
FIG. 4 is a characteristic diagram showing an off-axial wavefront aberration of an optical system for recording or reading CD according to a second embodiment of the present invention.
Figure 5:
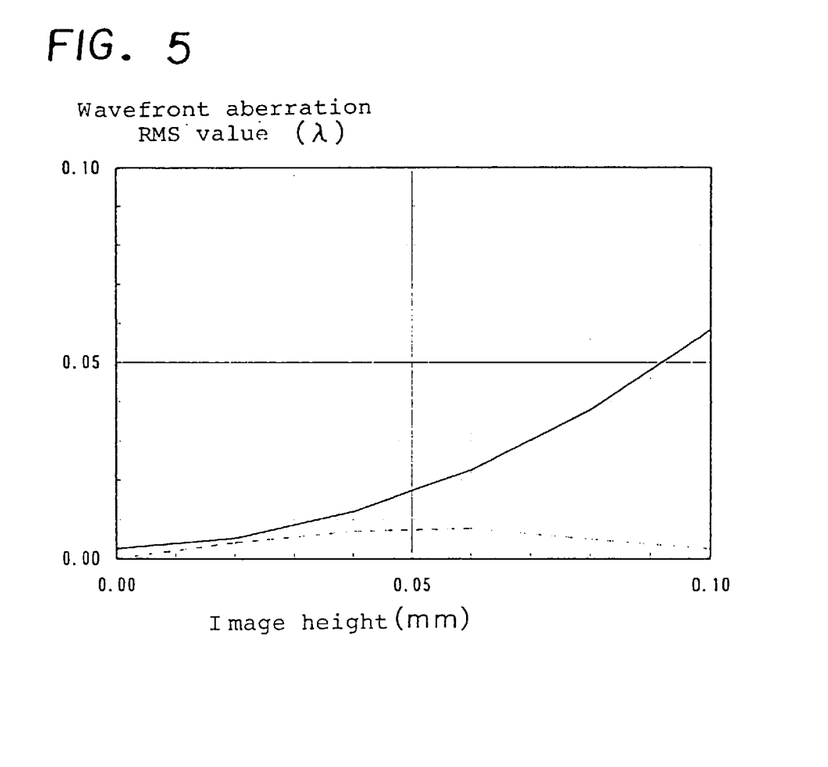
FIG. 5 is a characteristic diagram showing an off-axial wavefront aberration of an optical system for recording or reading DVD according to the second embodiment.

Table 5 shows specifications of the first auxiliary lens 2; Table 6 shows specifications of the objective lens 4; Table 7 shows specifications of the second auxiliary lens 7, and Table 8 shows specifications of the optical disks. FIG. 4 shows an off-axial wavefront aberration characteristic, obtained by calculation, of a combination of the first auxiliary lens 2 and the objective lens 4 (an optical system for recording or reading CD). FIG. 5 shows an off-axial wavefront aberration characteristic, obtained by calculation, of a combination of the second auxiliary lens 7 and the objective lens 4 (an optical system for recording or reading DVD).

Example 3

Figure 6:
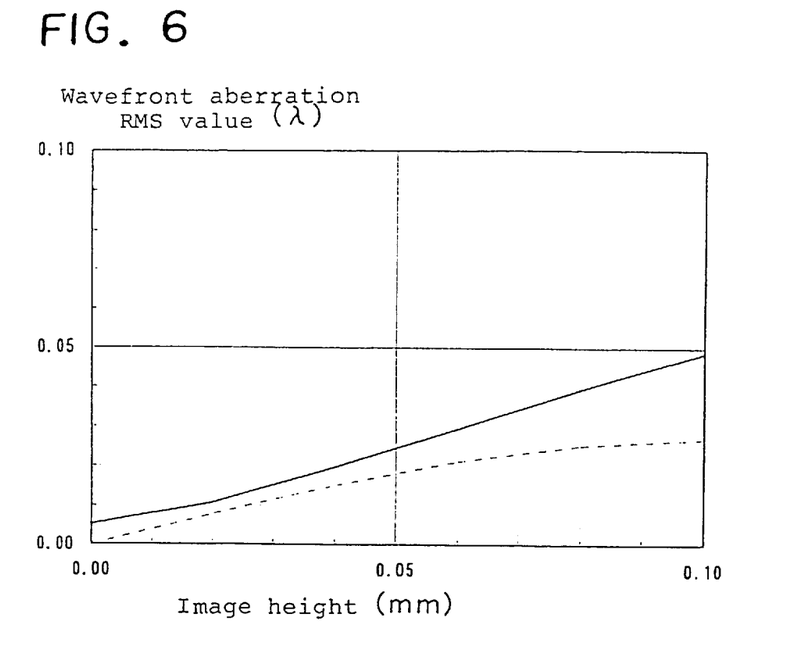
FIG. 6 is a characteristic diagram showing an off-axial wavefront aberration of an optical system for recording or reading CD according to a third embodiment of the present invention.
Figure 7:
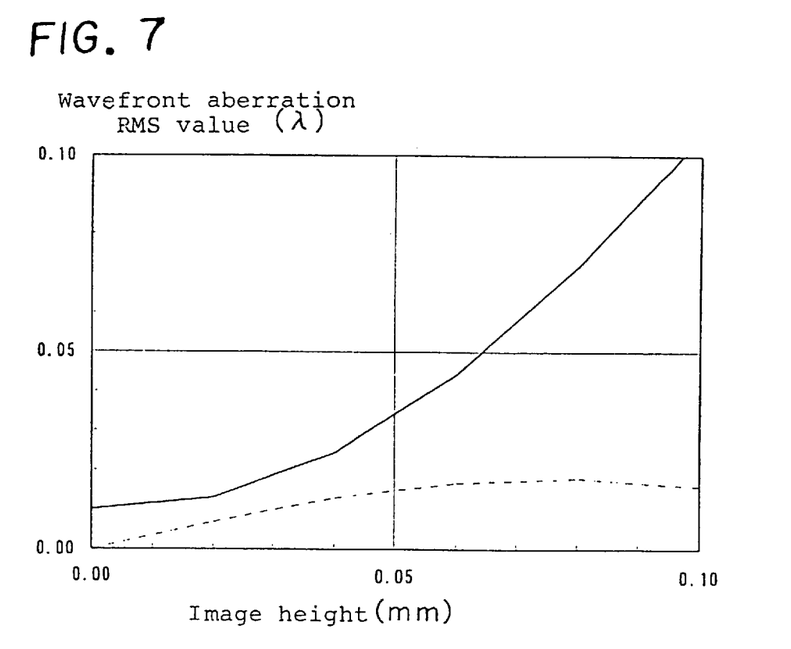
FIG. 7 is a characteristic diagram showing an off-axial wavefront aberration of an optical system for recording or reading DVD according to a third embodiment.

Table 9 shows specifications of the first auxiliary lens 2; Table 10 shows specifications of the objective lens 4; Table 11 shows specifications of the second auxiliary lens 7, and Table 12 shows specifications of the optical disks. FIG. 6 shows an off-axial wavefront aberration characteristic, obtained by calculation, of a combination of the first auxiliary lens 2 and the objective lens 4 (an optical system for recording or reading CD). FIG. 7 shows an off-axial wavefront aberration characteristic, obtained by calculation, of a combination of the second auxiliary lens 7 and the objective lens 4 (an optical system for recording or reading DVD).

Example 4

Figure 8:
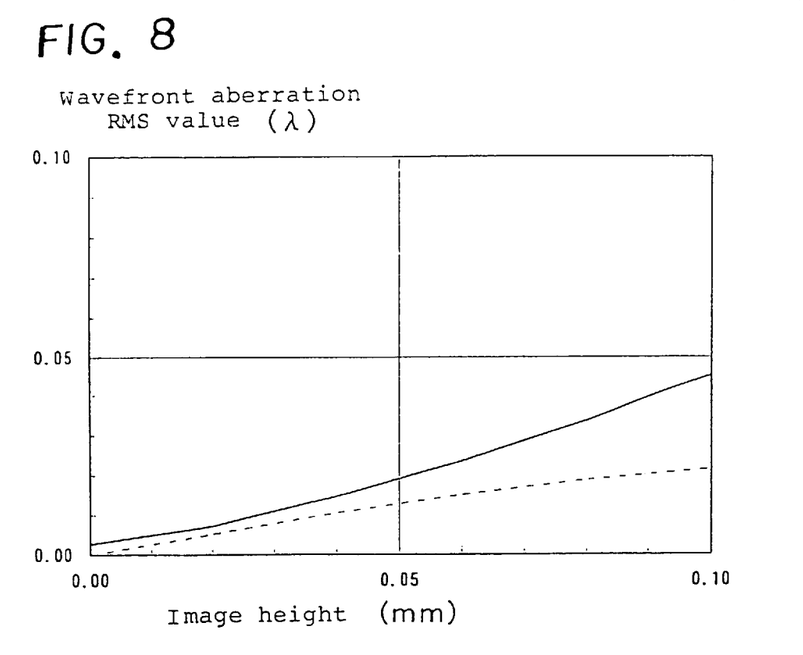
FIG. 8 is a characteristic diagram showing an off-axial wavefront aberration of an optical system for recording or reading CD according to a fourth embodiment of the present invention.
Figure 9:
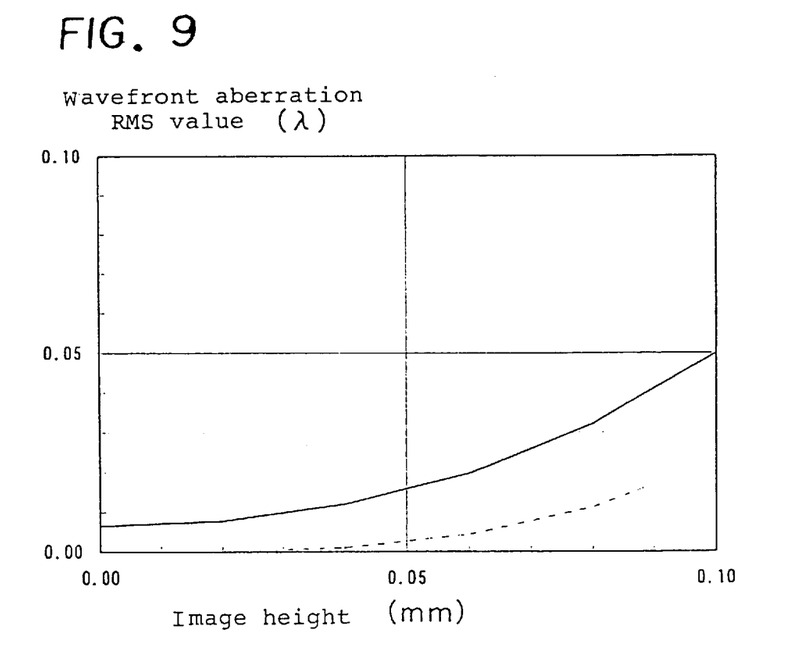
FIG. 9 is a characteristic diagram showing an off-axial wavefront aberration of an optical system for recording or reading DVD according to a fourth embodiment.

Table 13 shows specifications of the first auxiliary lens 2; Table 14 shows specifications of the objective lens 4; Table 15 shows specifications of the second auxiliary lens 7, and Table 16 shows specifications of the optical disks. FIG. 8 shows an off-axial wavefront aberration characteristic, obtained by calculation, of a combination of the first auxiliary lens 2 and the objective lens 4 (an optical system for recording or reading CD). FIG. 9 shows an off-axial wavefront aberration characteristic, obtained by calculation, of a combination of the second auxiliary lens 7 and the objective lens 4 (an optical system for recording or reading DVD).

Example 5

Figure 10:
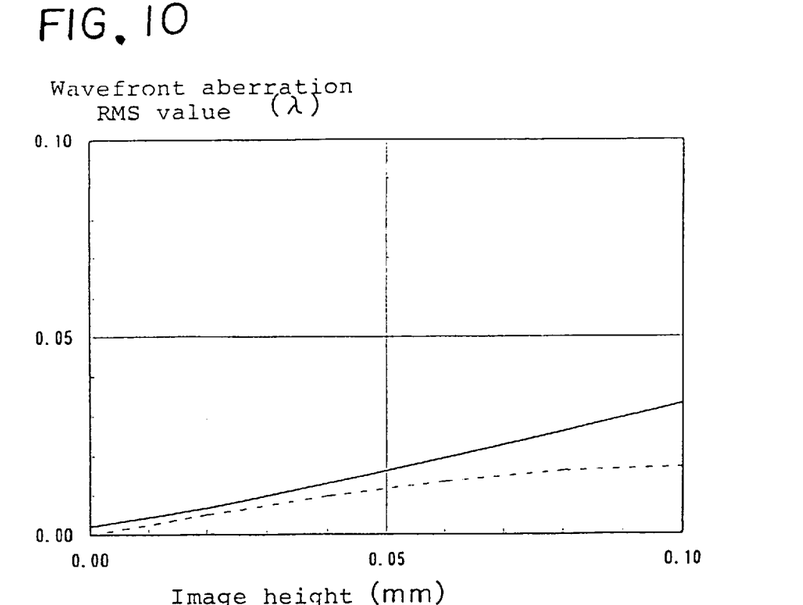
FIG. 10 is a characteristic diagram showing an off-axial wavefront aberration of an optical system for recording or reading CD according to a fifth embodiment of the present invention.
Figure 11:
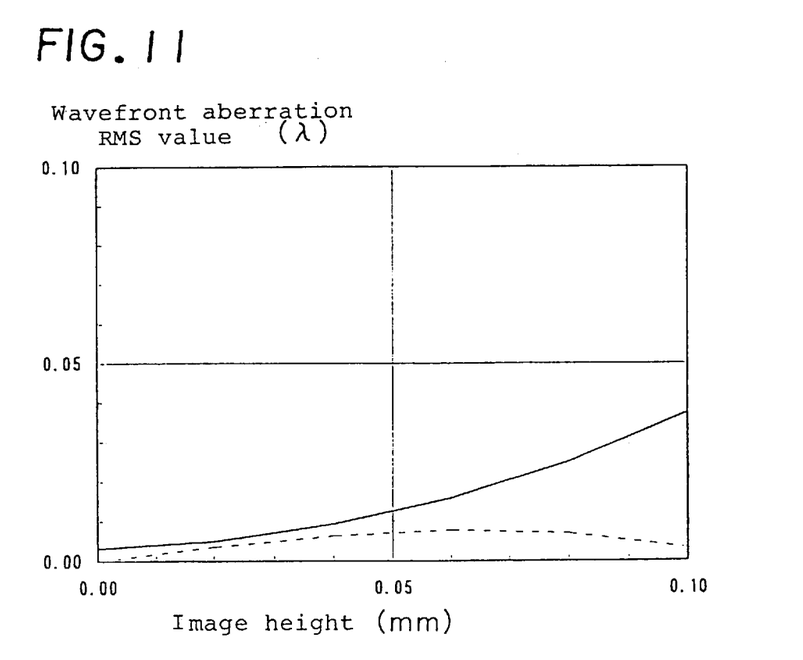
FIG. 11 is a characteristic diagram showing an off-axial wavefront aberration of an optical system for recording or reading DVD according to a fifth embodiment.

Table 17 shows specifications of the first auxiliary lens 2; Table 18 shows specifications of the objective lens 4; Table 19 shows specifications of the second auxiliary lens 7, and Table 20 shows specifications of the optical disks. FIG. 10 shows an off-axial wavefront aberration characteristic, obtained by calculation, of a combination of the first auxiliary lens 2 and the objective lens 4 (an optical system for recording or reading CD). FIG. 11 shows an off-axial wavefront aberration characteristic, obtained by calculation, of a combination of the first auxiliary lens 7 and the objective lens 4 (an optical system for recording or reading DVD).

TABLE 1

| | |
|---|---|
| f = 19.935 | $r_1$ = 137.1868 |
| $S_{11}$ = 18.00 | $r_2$ = −11.41763 |
| $S_{12}$ = 15.00 | $k_1$ = −379.2646 |
| d = 3.00 | $k_2$ = −0.5695827 |
| n = 1.519 | $a_{2,1}$ = 1.3349771E-3 |
| | $a_{2,2}$ = −2.004561E-6 |
| | $a_{4,1}$ = 0 |
| | $a_{4,2}$ = 0 |
| | $a_{6,1}$ = 0 |
| | $a_{6,2}$ = 0 |
| | $a_{8,1}$ = 0 |
| | $a_{8,2}$ = 0 |
| | $a_{10,1}$ = 0 |
| | $a_{10,2}$ = 0 |

TABLE 2

| | |
|---|---|
| f = 3.601 (wavelength 780 nm) | $r_1$ = 1.088411 |
| | $r_2$ = −5.224159 |
| f = 3.582 (wavelength 650 nm) | $k_1$ = −0.9523283 |
| | $k_2$ = −16.46137 |
| d = 2.5 | $a_{2,1}$ = −2.4334283E-1 |
| n = 1.519 (wavelength 780 nm) | $a_{2,2}$ = 1.4050116E-2 |
| | $a_{4,1}$ = 0 |
| n = 1.522 (wavelength 650 nm) | $a_{4,2}$ = 0 |
| | $a_{6,1}$ = 0 |
| | $a_{6,2}$ = 0 |
| | $a_{8,1}$ = 0 |
| | $a_{8,2}$ = 0 |
| | $a_{10,1}$ = 0 |
| | $a_{10,2}$ = 0 |

TABLE 3

| | |
|---|---|
| f = 17.902 | $r_1$ = 2.487929 |
| $S_{21}$ = 11.81 | $r_2$ = −2.85975 |
| $S_{22}$ = 5.793 | $k_1$ = −1.366259 |

TABLE 3-continued

| | |
|---|---|
| d = 3.0 | $k_2 = -0.05105628$ |
| n = 1.522 | $a_{2,1} = -4.8197613E-1$ |
| | $a_{2,2} = -3.7109984E-2$ |
| | $a_{4,1} = -3.0162823E-2$ |
| | $a_{4,2} = -1.634414E-3$ |
| | $a_{6,1} = -1.4847304E-2$ |
| | $a_{6,2} = -3.2470886E-4$ |
| | $a_{8,1} = 4.8642302E-3$ |
| | $a_{8,2} = 4.0698265E-5$ |
| | $a_{10,1} = -3.5012074E-3$ |
| | $a_{10,2} = -7.9481728E-6$ |

TABLE 4

| | Optical system for recording or reading CD | Optical system for recording or reading DVD |
|---|---|---|
| Wavelength | 780 nm | 650 nm |
| Thickness of transparent substrate of optical disk | 1.20 mm | 0.60 mm |
| NA | 0.45 | 0.60 |
| Diameter of aperture | φ 3.26 | φ 4.24 |
| Lateral magnification of whole optical system | −0.181 | −0.176 |
| Lateral magnification of objective lens | −0.001 | +0.017 |
| Working distance | 1.80 | 1.50 |
| RMS value of spherical aberration of 3rd order on optical axis (λ) | −0.006 λ | 0.006 λ |
| RMS value of off-axial aberration of image height of 0.1 mm (λ) | 0.004 λ | 0.008 λ |

TABLE 5

| | |
|---|---|
| f = 19.178 | $r_1 = 2.165887$ |
| $S_{11} = 15.2$ | $r_2 = 1.374117$ |
| $S_{12} = 5.00$ | $k_1 = -0.315051$ |
| d = 2.50 | $k_2 = -0.2326817$ |
| n = 1.519 | $a_{2,1} = 4.347976E-2$ |
| | $a_{2,2} = 5.7888143E-2$ |
| | $a_{4,1} = 0$ |
| | $a_{4,2} = 0$ |
| | $a_{6,1} = 0$ |
| | $a_{6,2} = 0$ |
| | $a_{8,1} = 0$ |
| | $a_{8,2} = 0$ |
| | $a_{10,1} = 0$ |
| | $a_{10,2} = 0$ |

TABLE 6

| | |
|---|---|
| f = 2.545 (wavelength 650 nm) | $r_1 = 0.9986585$ |
| f = 2.558 (wavelength 780 nm) | $r_2 = -2.391116$ |
| d = 2.5 | $k_1 = -0.9342216$ |
| n = 1.519 (wavelength 780 nm) | $k_2 = -8.362522$ |
| n = 1.522 (wavelength 650 nm) | $a_{2,1} = -2.0808148E-1$ |
| | $a_{2,2} = 4.1032025E-2$ |
| | $a_{4,1} = 0$ |
| | $a_{4,2} = 0$ |
| | $a_{6,1} = 0$ |
| | $a_{6,2} = 0$ |
| | $a_{8,1} = 0$ |

TABLE 6-continued

| | |
|---|---|
| | $a_{8,2} = 0$ |
| | $a_{10,1} = 0$ |
| | $a_{10,2} = 0$ |

TABLE 7

| | |
|---|---|
| f = 17.169 | $r_1 = 2.377482$ |
| $S_{21} = 15.20$ | $r_2 = 1.589000$ |
| $S_{22} = 5.0$ | $k_1 = -0.3509918$ |
| d = 2.5 | $k_2 = -0.3312584$ |
| n = 1.522 | $a_{2,1} = 2.095746E-2$ |
| | $a_{2,2} = -2.386283E-2$ |
| | $a_{4,1} = 0$ |
| | $a_{4,2} = 0$ |
| | $a_{6,1} = 0$ |
| | $a_{6,2} = 0$ |
| | $a_{8,1} = 0$ |
| | $a_{8,2} = 0$ |
| | $a_{10,1} = 0$ |
| | $a_{10,2} = 0$ |

TABLE 8

| | Optical system for recording or or reading CD | Optical system for recording or reading DVD |
|---|---|---|
| Wavelength | 780 nm | 650 nm |
| Thickness of transparent substrate of optical disk | 1.20 mm | 0.60 mm |
| NA | 0.45 | 0.60 |
| Diameter of aperture | φ 2.62 | φ 3.36 |
| Lateral magnification of whole optical system | −0.202 | −0.199 |
| Lateral magnification of objective lens | −0.188 | −0.122 |
| Working distance | 1.00 | 1.20 |
| RMS value of spherical aberration of 3rd order on optical axis (λ) | −0.001 λ | −0.001 λ |
| RMS value of off-axial aberration of image height of 0.1 mm (λ) | 0.018 λ | 0.003 λ |

TABLE 9

| | |
|---|---|
| f = 22.940 | $r_1 = 0.3070455$ |
| $S_{11} = 11.0$ | $r_2 = -0.2686751$ |
| $S_{12} = 5.00$ | $k_1 = -0.9987313$ |
| d = 2.50 | $k_2 = -1.001361$ |
| n = 1.519 | $a_{2,1} = -1.3267794$ |
| | $a_{2,2} = 2.3966867$ |
| | $a_{4,1} = 0$ |
| | $a_{4,2} = 0$ |
| | $a_{6,1} = 0$ |
| | $a_{6,2} = 0$ |
| | $a_{8,1} = 0$ |
| | $a_{8,2} = 0$ |
| | $a_{10,1} = 0$ |
| | $a_{10,2} = 0$ |

TABLE 10

| | |
|---|---|
| f = 2.338 (wavelength 650 nm) | $r_1 = 0.6505232$ |
| f = 2.349 (wavelength 780 nm) | $r_2 = -2.000704$ |
| d = 2.5 | $k_1 = -0.9870026$ |
| n = 1.519 (wavelength | $k_2 = -6.453719$ |
| | $a_{2,1} = -4.5657863E-1$ |
| | $a_{2,2} = 3.9897472E-2$ |

TABLE 10-continued

| | |
|---|---|
| 780 nm) | $a_{4.1} = 0$ |
| n = 1.522 (wavelength | $a_{4.2} = 0$ |
| 650 nm) | $a_{6.1} = 0$ |
| | $a_{6.2} = 0$ |
| | $a_{8.1} = 0$ |
| | $a_{8.2} = 0$ |
| | $a_{10.1} = 0$ |
| | $a_{10.2} = 0$ |

TABLE 11

| | |
|---|---|
| f = 29.119 | $r_1 = 0.3213644$ |
| $S_{21} = 14.0$ | $r_2 = -0.2590871$ |
| $S_{22} = 5.0$ | $k_1 = -0.9986513$ |
| d = 2.5 | $k_2 = -1.002227$ |
| n = 1.522 | $a_{2.1} = -1.2945887$ |
| | $a_{2.2} = 2.3436269$ |
| | $a_{4.1} = 0$ |
| | $a_{4.2} = 0$ |
| | $a_{6.1} = 0$ |
| | $a_{6.2} = 0$ |
| | $a_{8.1} = 0$ |
| | $a_{8.2} = 0$ |
| | $a_{10.1} = 0$ |
| | $a_{10.2} = 0$ |

TABLE 12

| | Optical system for recording or reading CD | Optical system for recording or reading DVD |
|---|---|---|
| Wavelength | 780 nm | 650 nm |
| Thickness of transparent substrate of optical disk | 1.20 mm | 0.60 mm |
| NA | 0.45 | 0.60 |
| Diameter of aperture | φ 2.52 | φ 3.20 |
| Lateral magnification of whole optical system | −0.196 | −0.171 |
| Lateral magnification of objective lens | −0.282 | −0.211 |
| Working distance | 1.00 | 1.20 |
| RMS value of spherical aberration of 3rd order on optical axis (λ) | −0.004 λ | −0.006 λ |
| RMS value of off-axial aberration of image height of 0.1 mm (λ) | 0.027 λ | 0.016 λ |

TABLE 13

| | |
|---|---|
| f = 24.231 | $r_1 = 2.201877$ |
| $S_{11} = 14.5$ | $r_2 = 1.502966$ |
| $S_{12} = 5.00$ | $k_1 = -0.4243595$ |
| d = 2.50 | $k_2 = -0.3086344$ |
| n = 1.519 | $a_{2.1} = 4.5763386E-2$ |
| | $a_{2.2} = 1.0390264E-1$ |
| | $a_{4.1} = 0$ |
| | $a_{4.2} = 0$ |
| | $a_{6.1} = 0$ |
| | $a_{6.2} = 0$ |
| | $a_{8.1} = 0$ |
| | $a_{8.2} = 0$ |
| | $a_{10.1} = 0$ |
| | $a_{10.2} = 0$ |

TABLE 14

| | |
|---|---|
| f = 2.471 (wavelength 650 nm) | $r_1 = 0.6899328$ |
| f = 2.483 (wavelength 780 nm) | $r_2 = -2.250375$ |
| d = 2.5 | $k_1 = -0.979928$ |
| n = 1.519 (wavelength 780 nm) | $k_2 = -7.784517$ |
| n = 1.522 (wavelength 650 nm) | $a_{2.1} = -4.2723758E-1$ |
| | $a_{2.2} = 3.809841E-2$ |
| | $a_{4.1} = 0$ |
| | $a_{4.2} = 0$ |
| | $a_{6.1} = 0$ |
| | $a_{6.2} = 0$ |
| | $a_{8.1} = 0$ |
| | $a_{8.2} = 0$ |
| | $a_{10.1} = 0$ |
| | $a_{10.2} = 0$ |

TABLE 15

| | |
|---|---|
| f = 20.902 | $r_1 = -0.4685343$ |
| $S_{21} = 12.6$ | $r_2 = 0.2915483$ |
| $S_{22} = 5.0$ | $k_1 = -1.002575$ |
| d = 2.5 | $k_2 = -0.9984027$ |
| n = 1.522 | $a_{2.1} = 1.2578355$ |
| | $a_{2.2} = -1.4997527$ |
| | $a_{4.1} = 0$ |
| | $a_{4.2} = 0$ |
| | $a_{6.1} = 0$ |
| | $a_{6.2} = 0$ |
| | $a_{8.1} = 0$ |
| | $a_{8.2} = 0$ |
| | $a_{10.1} = 0$ |
| | $a_{10.2} = 0$ |

TABLE 16

| | Optical system for recording or reading CD | Optical system for recording or reading DVD |
|---|---|---|
| Wavelength | 780 nm | 650 nm |
| Thickness of transparent substrate of optical disk | 1.20 mm | 0.60 mm |
| NA | 0.45 | 0.60 |
| Diameter of aperture | φ2.60 | φ3.30 |
| Lateral magnification of whole optical system | −0.195 | −0.195 |
| Lateral magnification of objective lens | −0.217 | −0.150 |
| Working distance | 1.00 | 1.20 |
| RMS value of spherical aberration of 3rd order on optical axis (λ) | −0.002λ | 0.006λ |
| RMS value of off-axial aberration of image height of 0.1 mm (λ) | 0.022λ | 0.023λ |

TABLE 17

| | |
|---|---|
| f = 21.666 | $r_1 = 2.163497$ |
| $S_{11} = 20.0$ | $r_2 = 1.407519$ |
| $S_{12} = 5.00$ | $k_1 = -0.3259659$ |
| d = 2.50 | $k_2 = -0.2096213$ |
| n = 1.519 | $a_{2.1} = 2.4376949E-2$ |
| | $a_{2.2} = 1.9215686E-2$ |
| | $a_{4.1} = 0$ |
| | $a_{4.2} = 0$ |
| | $a_{6.1} = 0$ |
| | $a_{6.2} = 0$ |
| | $a_{8.1} = 0$ |

TABLE 17-continued $a_{8,2} = 0$
$a_{10,1} = 0$
$a_{10,2} = 0$

TABLE 18

| | |
|---|---|
| f = 2.696 (wavelength 650 nm) | $r_1 = 1.008413$ |
| f = 2.710 (wavelength 780 nm) | $r_2 = -2.810646$ |
| d = 2.5 | $k_1 = -0.9232155$ |
| n = 1.519 (wavelength 780 nm) | $k_2 = -11.78389$ |
| n = 1.522 (wavelength 650 nm) | $a_{2,1} = -2.146956E{-}1$ |
| | $a_{2,2} = 3.4760064E{-}2$ |
| | $a_{4,1} = 0$ |
| | $a_{4,2} = 0$ |
| | $a_{6,1} = 0$ |
| | $a_{6,2} = 0$ |
| | $a_{8,1} = 0$ |
| | $a_{8,2} = 0$ |
| | $a_{10,1} = 0$ |
| | $a_{10,2} = 0$ |

TABLE 19

| | |
|---|---|
| f = 21.957 | $r_1 = 2.534475$ |
| $S_{21} = 22.0$ | $r_2 = 1.817138$ |
| $S_{22} = 5.0$ | $k_1 = -0.3230647$ |
| d = 2.5 | $k_2 = -0.2247258$ |
| n = 1.522 | $a_{2,1} = 9.6160849E{-}3$ |
| | $a_{2,2} = -2.210385E{-}2$ |
| | $a_{4,1} = 0$ |
| | $a_{4,2} = 0$ |
| | $a_{6,1} = 0$ |
| | $a_{6,2} = 0$ |
| | $a_{8,1} = 0$ |
| | $a_{8,2} = 0$ |
| | $a_{10,1} = 0$ |
| | $a_{10,2} = 0$ |

In the optical device of the present invention, it is unnecessary to use a moving mechanism whereby reduction of size and reduction of weight can be achieved, and therefore productivity is improved. Further, a gradual change of inclination of the light source and lens from the optical axis or a gradual change of a shift of these elements from the optical axis is minimized, and an on-axial aberration and an off-axial aberration are excellent whereby a desired optical performance is provided.

Obviously, numerous modifications and variations of the present invention are possible in light of the above teachings. It is therefore to be understood that within the scope of the appended claims, the invention may be practiced otherwise than as specifically described herein.

What is claimed is:

1. In an optical device for recording or reading data in a data recording surface of an optical disk by collecting light from a light source on the data recording surface through an objective lens, reflection light from the data recording surface being received by a light receiving element through the objective lens, the optical device being characterized in that:

a first light source and a second light source are provided as the light source;

a first auxiliary lens and a second auxiliary lens are provided in addition to the objective lens;

a first optical disk and a second optical disk are provided as the optical disk and are least one of the first and second optical disks are adapted to be inserted to record or read the data in the data recording surface wherein the thickness of a transparent substrate of the first optical disk is different from the thickness of a transparent substrate of the second optical disk;

wherein the recording or reading of the data in the data recording surface of the first optical disk is effected by collecting, on the data recording surface of the first optical disk, the light from the first light source through the first auxiliary lens and the objective lens in this order, the recording or reading of the data in the data recording surface of the second optical disk is effected by collecting, on the data recording surface of the second optical disk, the light from the second light source through the second auxiliary lens and the objective lens in this order, and at least one of the following Formulas (A) and (B) is satisfied:

$$-0.35 \leq \beta_1 \leq -0.06 \quad (A)$$

$$-0.25 \leq \beta_2 \leq -0.07 \quad (B)$$

wherein $\beta_1$ represents a lateral magnification of the objective lens in correspondence with a combination of the first light source and the transparent substrate of the first optical disk and $\beta_2$ represents a lateral magnification of the objective lens in correspondence with a combination of the second light source and the transparent substrate of the second optical disk, provided that $t_1 > t_2$ and $t_1$ represents the thickness of the transparent substrate of the first optical disk and $t_2$ represents the thickness of the transparent substrate of the second optical disk.

2. The optical device according to claim 1, wherein $$\beta_1 < \beta_2$$

where $\beta_1$ represents a lateral magnification of the objective lens in correspondence with a combination of the first light source and the transparent substrate of the first optical disk and $\beta_2$ represents a lateral magnification of the objective lens in correspondence with a combination of the second light source and the transparent substrate of the second optical disk, provided that $t_1 > t_2$ wherein $t_1$ represents the thickness of the transparent substrate of the first optical disk and $t_2$ represents the thickness of the transparent substrate of the second optical disk.

3. The optical device according to claim 1, wherein 8 mm$\leq S_{11} \leq$14.5 mm and 8 mm$\leq S_{21} \leq$25 mm where $S_{11}$ represents a distance on the optical axis from the first light source to a surface of the second auxiliary lens facing the light source and $S_{21}$ represents a distance on the optical axis from the second light source to a surface of the second auxiliary lens facing the light source and $S_{21}$ represents a distance on the optical axis from the second light source to a surface of the second auxiliary lens facing the light source, provided that $t_1 > t_2$ wherein $t_1$ represents the thickness of the transparent substrate of the first optical disk and $t_2$ represents the thickness of the transparent substrate of the second optical disk.

4. The optical device according to claim 1, wherein at least one selected from the first auxiliary lens and the second auxiliary lens is a collimator lens.

5. The optical device according to claim 1, wherein:

in recording or reading the data in the date recording surface of the first optical disk, optical characteristics of a combination of the first auxiliary lens and the objective lens are determined so that the absolute value in RMS value of a spherical aberration of the third order is 0.03 $\lambda_1$ or less and an off-axial coma aberration in an image height of 0.1 mm is 0.03 $\lambda_1$ or less, and in recording or reading the data in the data recording surface of the second optical disk, optical characteristics of a combination of the second auxiliary lens and the objective lens are determined so that the absolute value in RMS value of a spherical aberration of the third order is 0.03 $\lambda_2$ or less and an off-axial coma aberration in an image height of 0.1 mm is 0.03 $\lambda_2$ or less where $\lambda_1$ represents a wavelength of the light from the first light source and $\lambda_2$ represents a wavelength of the light from the second light source.

6. In an optical device for recording or reading data in a data recording surface of an optical disk by collecting light from a light source on the data recording surface through an objective lens, reflection light from the data recording surface being received by a light receiving element through the objective lens, the optical device being characterized in that:

a first light source and a second light source are provided as the light source;

a first auxiliary lens, a second auxiliary lens and an optical material are provided in addition to the objective lens;

a first optical disk and a second optical disk are provided as the optical disk and at least one of the first and second optical disks are adapted to be inserted wherein the thickness of a transparent substrate of the first optical disk is different from the thickness of a transparent substrate of the second optical disk;

wherein the recording or reading of the data in the data recording surface of the first optical disk is effected by collecting, on the data recording surface of the first optical disk, the light from the first light source through for the first auxiliary lens, the optical material and the objective lens in the order, the recording or reading of the data in the data recording surface of the second optical disk is effected by collecting, on the data recording surface of the second optical disk, the light from the second light source through the second auxiliary lens, the optical material and the objective lens in this order, and at least one of the following Formulas (A) and (B) is satisfied:

$$-0.35 \leq \beta_1 \leq -0.06 \quad \text{(A)}$$

$$-0.25 \leq \beta_2 \leq -0.07 \quad \text{(B)}$$

wherein $\beta_1$ represents a lateral magnification of the objective lens in correspondence with a combination of the first light source and the transparent substrate of the first optical disk and $\beta_2$ represents a lateral magnification of the objective lens in correspondence with a combination of the second light source and the transparent substrate of the second optical disk, provided that $t_1 > t_2$ and $t_1$ represents the thickness of the transparent substrate of the first optical disk and $t_2$ represents the thickness of the transparent substrate of the second optical disk.

7. The optical device according to claim 6, wherein $$\beta_1 < \beta_2$$

where $\beta_1$ represents a lateral magnification of the objective lens in correspondence with a combination of the first light source and the transparent substrate of the first optical disk and $\beta_2$ represents a lateral magnification of the objective lens in correspondence with a combination of the second light source and the transparent substrate of the second optical disk, provided that $t_1 > t_2$ wherein $t_1$ represents the thickness of the transparent substrate of the first optical disk and $t_2$ represents the thickness of the transparent substrate of the second optical disk.

8. The optical device according to claim 6, wherein 8 mm < $S_{11}$ ≤ 14.5 mm and 8 mm ≤ $S_{21}$ ≤ 25 mm where $S_{11}$ represents a distance on the optical axis from the first light source to a surface of the second auxiliary lens facing the light source and $S_{21}$ represents a distance on the optical axis from the second light source to a surface of the second auxiliary lens facing the light source, provided that $t_1 > t_2$ wherein $t_1$ represents the thickness of the transparent substrate of the first optical disk and $t_2$ represents the thickness of the transparent substrate of the second optical disk.

9. The optical device according to claim 6, wherein:

in recording or reading the data in the date recording surface of the first optical disk, optical characteristics of a combination of the first auxiliary lens and the objective lens are determined so that the absolute value in RMS value of a spherical aberration of the third order is 0.03 $\lambda_1$ or less and an off-axial coma aberration in an image height of 0.1 mm is 0.03 $\lambda_1$ or less, and in recording or reading the data in the data recording surface of the second optical disk, optical characteristics of a combination of the second auxiliary lens and the objective lens are determined so that the absolute value in RMS value of a spherical aberration of the third order is 0.03 $\lambda_2$ or less and an off-axial coma aberration in an image height of 0.1 mm is 0.03 $\lambda_2$ or less where $\lambda_1$ represents a wavelength of the light from the first light source and $\lambda_2$ represents a wavelength of the light from the second light source.

10. The optical device according to claim 6, wherein at least one selected from the first auxiliary lens and the second auxiliary lens is a collimator lens.

11. The optical device according to claim 6, wherein the optical materials are half mirrors.

* * * * *